US012157214B2

(12) United States Patent
Wang

(10) Patent No.: US 12,157,214 B2
(45) Date of Patent: Dec. 3, 2024

(54) FASTENING DEVICE

(71) Applicant: HANGZHOU GREAT STAR INDUSTRIAL CO., LTD., Hangzhou (CN)

(72) Inventor: Weiyi Wang, Hangzhou (CN)

(73) Assignee: HANGZHOU GREAT STAR INDUSTRIAL CO., LTD. (CN)

( * ) Notice: Subject to any disclaimer, the term of this patent is extended or adjusted under 35 U.S.C. 154(b) by 90 days.

(21) Appl. No.: 18/157,638

(22) Filed: Jan. 20, 2023

(65) Prior Publication Data

US 2023/0158655 A1 May 25, 2023

Related U.S. Application Data

(63) Continuation-in-part of application No. PCT/CN2020/104451, filed on Jul. 24, 2020.

(51) Int. Cl.
*B25C 7/00* (2006.01)
*E04F 21/22* (2006.01)
*B25C 1/00* (2006.01)

(52) U.S. Cl.
CPC ................ *B25C 7/00* (2013.01); *E04F 21/22* (2013.01); *B25C 1/001* (2013.01)

(58) Field of Classification Search
CPC ... B25C 7/00; B25C 1/001; B25C 1/00; E04F 21/22
See application file for complete search history.

(56) References Cited

U.S. PATENT DOCUMENTS 3,764,053 A * 10/1973 Thompson .............. B27F 7/006 227/111
7,344,057 B2 3/2008 Dion et al.
(Continued)

FOREIGN PATENT DOCUMENTS

CN 102962813 A 3/2013
CN 205444847 U 8/2016
(Continued)

OTHER PUBLICATIONS

International Search Report and Written Opinion for PCT/CN2020/104451 mailed Apr. 16, 2021, 9 pages (with translation).

*Primary Examiner* — Robert F Long
*Assistant Examiner* — Xavier A Madison
(74) *Attorney, Agent, or Firm* — Jaffery Watson Hamilton & DeSanctis LLP

(57) ABSTRACT

The present invention discloses a fastening device, comprising a main body and a holding part, wherein the main body constitutes a main plane, and the holding part and the main body are rotatably connected to each other; and the holding part comprises a first arm and a second arm, the first arm is provided with a first connection mechanism and a second connection mechanism, the first arm is rotatably connected to the main body via the first connection mechanism, and the second arm is rotatably connected to the first arm via the second connection mechanism. Such a fastening device can be used for the installation of floorings. Not only can the height of a handle be changed, but also the angle at which the handle is held can be changed at the same time. Moreover, the fastening device is further provided with a detachable auxiliary moving device, which can easily move a base during use, but the auxiliary moving device can be removed when it is not needed, which is convenient for packaging and transportation.

11 Claims, 16 Drawing Sheets

(56) References Cited

U.S. PATENT DOCUMENTS

| | | | | |
|---|---|---|---|---|
| 2006/0124683 | A1* | 6/2006 | Dion | B25F 5/02 227/8 |
| 2010/0193564 | A1* | 8/2010 | Buck | B25F 5/02 227/120 |
| 2015/0174749 | A1 | 6/2015 | Liu et al. | |

FOREIGN PATENT DOCUMENTS

| | | | |
|---|---|---|---|
| CN | 107160332 | A | 9/2017 |
| CN | 207749804 | U | 8/2018 |
| CN | 111319006 | A | 6/2020 |
| TW | 201524708 | A | 7/2015 |
| WO | 2022016508 | A1 | 1/2022 |

* cited by examiner

FASTENING DEVICE

RELATED APPLICATIONS

The present application is a continuation-in-part (CIP) application of International Application No. PCT/CN2020/104451 filed on Jul. 24, 2020, the disclosure of which is incorporated herein in its entirety by reference.

FIELD OF THE INVENTION

The present invention relates to a power tool, and in particular to a fastening device with an adjustable handle.

DESCRIPTION OF THE PRIOR ART

The installation of wooden boards is one of the most common procedures in construction and decoration processes. Among other things, the installation of floorings is the most common. A common flooring installation method is to lay keels on the ground, lay flooring materials having a standard size and a tongue-groove structure reasonably, and fix floorings to the keels with nails. Specifically, the nails are driven diagonally into tongue parts of the floorings to connect same to the keels. This process is repeated for each flooring until all the floorings are secured.

In a construction process, a flooring nail gun is a commonly used tool. The flooring nail gun has the advantages of high accuracy, labor saving, high efficiency, and not easy to damage materials. This enables the installation of the wooden boards to operate efficiently.

However, the flooring nail gun also has its limitations. Since the nails for fixing the floorings need to be driven in one time, there are certain requirements for the strength and weight of the nail gun itself. If its own strength or weight cannot meet the requirements, it will cause problems such as failure to drive the nail, rebound, and damage. Therefore, a main body of the commonly used nail gun is mainly made of cast iron, which has a certain weight and is cumbersome to move. Especially during use, a user needs to stand up or squat down according to the actual situation, and the nail gun needs to be moved frequently. If the holding posture is not appropriate, it will cause fatigue of hands, arms, and the back, so that it is impossible for the user to work for a long time, thus reducing the work efficiency, and even causing a physical injury.

In the prior art, some techniques have appeared to improve the posture of the user holding the flooring nail gun.

For example, in some technical solutions, a handle that can be raised and lowered is used. When the user is standing up for construction, the handle can be raised to prevent the user from bending; and when the user is squatting down, the handle can be lowered to avoid being unable to hold it properly.

In some application scenarios, due to the height limitation of the site, the nail gun cannot fully enter the construction space. Therefore, in some technical solutions, the handle is additionally provided with a rotating shaft, such that the handle can be turned away from the plane where a base is located, and the absolute height of the nail gun is reduced during the construction process.

Although the above prior art can improve the posture of the user holding the nail gun to a certain extent, there are still some unsolved technical problems. For example, in the prior art, although the height of the handle can be changed in some ways, the angle at which the handle is held cannot be changed. The user needs to hold the nail gun at the same angle in different postures, which will still cause inconvenience and fatigue. In addition, the nail gun needs to be moved frequently. The larger the construction area, the greater the frequency and range of movement. For a bulky main body, an auxiliary moving device is necessary. If the addition of an auxiliary moving device is considered only, the volume and weight of the main body will further increase, which will have an unfavorable effect on transportation and packaging.

Therefore, those skilled in the art devote themselves to developing a fastening device to solve the technical problems existing in the prior art. Such a fastening device can be used for the installation of floorings. Not only can the height of a handle be changed, but also the angle at which the handle is held can be changed at the same time. Moreover, the fastening device is further provided with a detachable auxiliary moving device, which can easily move a base during use, but the auxiliary moving device can be removed when it is not needed, which is convenient for packaging and transportation.

SUMMARY OF THE INVENTION

In view of the above defects in the prior art, the technical problem to be solved by the present invention is how to provide a fastening device, which can reduce the fatigue of users, improve the work efficiency and facilitate movement and transportation.

In order to achieve the above object, the present invention provides a fastening device comprising a main body and a holding part, wherein the holding part is connected to the main body.

Further, the holding part comprises a first arm, the first arm is provided with a first connection mechanism, and the first arm is rotatably connected to the main body via the first connection mechanism.

Further, the first connection mechanism comprises a first shaft, the first arm is configured to be able to rotate about the first shaft, and the first connection mechanism is provided with a first locking/unlocking mechanism, such that the first arm has at least two locking positions where the first arm is able to be stationary relative to the main body when no external force is applied.

Further, the holding part also comprises a second arm, the first arm is further provided with a second connection mechanism, the second arm is rotatably connected to the first arm via the second connection mechanism, and the second connection mechanism is provided with a second locking/unlocking mechanism, such that the second arm has at least two locking positions where the second arm is able to be stationary relative to the main body when no external force is applied.

Further, the second connection mechanism comprises: a lug provided on the second arm, the lug being provided with a first through-hole; and a second through-hole provided in the first arm, wherein the first through-hole and the second through-hole are overlapped to allow a strip-shaped object to pass through, so as to connect the first arm and the second arm.

Further, the second locking/unlocking mechanism further comprises a pin, a retaining shaft and an operation part, wherein the retaining shaft is fixedly connected to the operation part via the pin; the pin and the retaining shaft both pass through the first through-hole and the second through-hole; the pin, the retaining shaft, and the operation part are coaxially arranged with the second shaft; and the operation part is configured to be able to drive the retaining shaft to move axially under the action of an external force.

Further, a toothed ring is fixedly provided on an inner side of the first through-hole, rotating shaft teeth are fixedly provided on an outer surface of the retaining shaft, and the retaining shaft is configured to be able to realize the engagement and disengagement between the rotating shaft teeth and the toothed ring under the drive of the operation part.

Further, a toothed ring is provided on an inner side of the first through-hole, rotating shaft teeth are fixedly provided on an outer surface of the retaining shaft, and the toothed ring engages with the rotating shaft teeth and is configured to be able to realize the locking and unlocking between the toothed ring and the lug under the control of the operation part.

Further, a toothed ring is fixedly provided on an inner side of the first through-hole, a rotating shaft teeth is provided in the second through-hole, and the toothed ring engages with the rotating shaft teeth and is configured to be able to realize the locking and unlocking between the rotating shaft teeth and the first arm under the control of the operation part.

Further, an inner side of the first through-hole is provided with a retaining groove, an outer side of the retaining shaft is provided with two one-way bearings, and the size and the shape of an inner contour of the retaining groove conform to those of an outer contour of each of the two one-way bearings; the rotation directions of the two one-way bearings are opposite; and the retaining shaft is configured to be able to realize the locking and separation between the two one-way bearings and the retaining groove under the drive of the operation part.

Further, the holding part also comprises a third arm connected to the main body.

Further, a base is also comprised, which comprises an adjustable plate and a height adjustment part, wherein the height of the adjustable plate is changed by the height adjustment part.

Further, the height adjustment part comprises a stud fixedly connected to the adjustable plate, and the adjustable plate is connected to the main body via the stud.

Further, the main body is provided with an annular rotating disk, and threads on an inner surface of the annular rotating disk engage with threads on an outer surface of the stud.

Further, the height adjustment part comprises an adjustment camshaft, and an upper surface of the adjustable plate is in contact with the camshaft.

Further, the height adjustment part comprises two camshafts, the main body is provided with a driving wheel, and each of the camshafts is provided with a driven wheel, the driven wheels are connected to the driving wheel, and the driven wheels are configured to drive the two camshafts to rotate at the same angular velocity.

Further, a base is also comprised, which comprises a base body and a moving mechanism detachably connected to the base body.

Further, the moving mechanism comprises roller brackets detachably connected to the base body.

Further, sliding grooves are provided on sides of the base body, and the roller brackets are connected to the base body via the sliding grooves.

Further, each of the roller brackets is provided with a bracket ball, a ball retaining groove is provided at a corresponding position on the respective sliding groove, and the bracket ball mates with the ball retaining groove to realize the locking of the roller bracket.

Compared with the prior art, the present invention has at least the following technical effects:

1) With the adjustment of two connection mechanisms of the present invention, the overall height of the device can be adjusted to adapt to the heights of different users, or adapt to the construction postures of standing up or squatting down, so as to reduce the fatigue of the user due to the improper height or standing posture, and this is also convenient for packaging and transportation.
2) In the present invention, the angle of the second arm can be adjusted to adapt to the hand-held angle of the user, and reduce the fatigue of the user due to the improper holding posture.
3) In an embodiment of the present invention, the holding part can be rotated to different planes, and the present invention is therefore suitable for scenarios where the construction space is limited.
4) In an embodiment of the present invention, an adjustable backing plate is designed to reduce the damage to a wooden board in the present invention.
5) In an embodiment of the present invention, an auxiliary moving mechanism is designed to facilitate the movement of the entire device and reduce the fatigue of the user due to frequent and long-distance movement.
6) In the present invention, since the device can be folded, the overall volume during transportation is small, and the cost of packaging and transportation can be reduced; and the device can be applied to various working scenarios and reduce the fatigue of the user, so that the work efficiency is improved and the average construction cost is reduced.
7) The concept, specific structure and resulting technical effects of the present invention are further described below in conjunction with the drawings to fully understand the object, features, and effects of the present invention.

Figure 1:
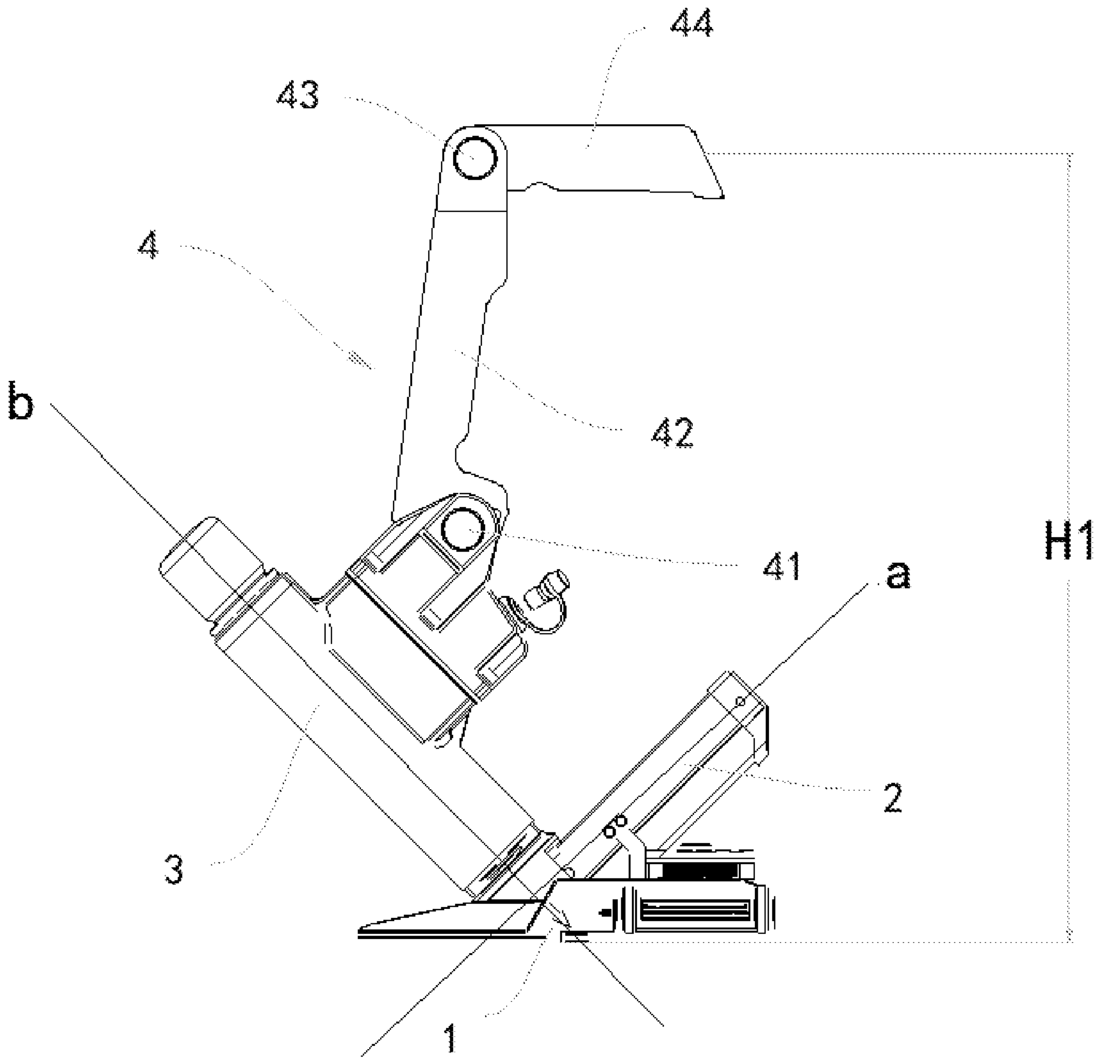
FIG. 1 is a schematic diagram of an overall structure in a state according to an embodiment of the present invention.

In the figures, 1—base, 11—base body, 111—limiting plate, 112—rotating disk, 113—circlip, 114—rotating disk bolt, 12—adjustable plate, 121—adjustable plate stud, 122—backing plate, 123—backing plate screw, 124—height adjustment part, 1241—driving wheel, 1242—connecting rod, 1243—driven wheel, 1244—driving gear, 1245—driven gear, 125—height adjustment camshaft, 130—moving mechanism, 130—moving mechanism, 13—roller bracket, 14—roller, 15—sliding groove, 16—bracket ball, 17—bracket ball retaining groove, 2—fastener container, 3—driving mechanism, 4—holding part, 41—first connection mechanism, 42—first handle, 420—through-hole of the first handle, 420—through-hole of the first handle, 421—groove, 43—second connection mechanism, 431—button, 432—spring, 433—pin, 434—retaining shaft, 435—rotating shaft tooth, 436—bearing matching part, 437—one-way bearing, 438—knob, 4381—ball groove, 439—ball, 4310—ball spring, 4311—eccentric cam, 4312—lever, 4313—raised shaft, 4314—toothed fastener, 44—second handle, 441—toothed ring, 442—lug, 4420—through-hole of the lug, 443—retaining groove, 5—third handle.

DETAILED DESCRIPTION OF THE PREFERRED EMBODIMENTS

Preferred embodiments of the present invention are described below with reference to the drawings of the description to make the technical contents clearer and easier to understand. The present invention can be embodied in various forms of embodiments, and the scope of protection of the present invention is not limited to the embodiments mentioned herein.

In the drawings, the same reference numeral indicates components having the same structure, and similar reference numerals indicate assemblies having similar structures or functions throughout. The size and thickness of each assembly shown in the figures are shown arbitrarily, and the present invention does not define the size and thickness of each assembly. In order to make the illustration clearer, the thickness of the component in some places of the figures is appropriately exaggerated.

Embodiment 1

Figure 2:
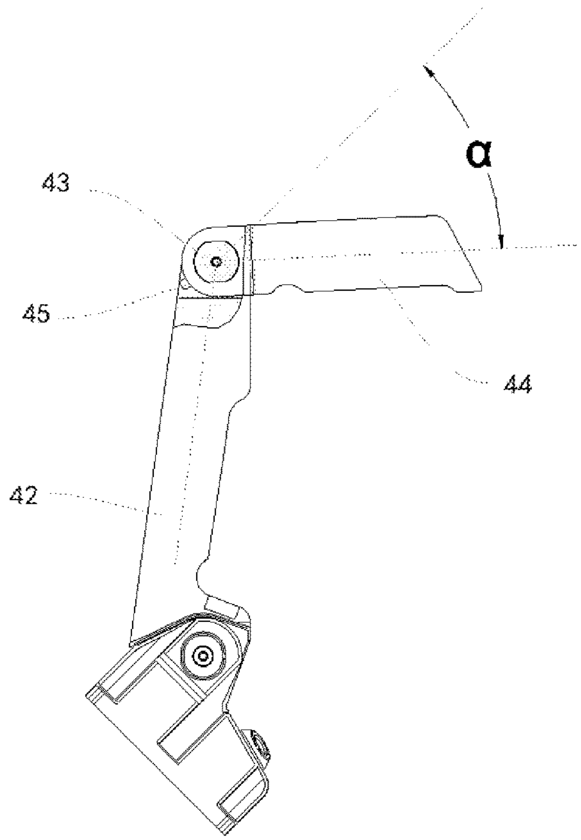
FIG. 2 is a schematic diagram of the rotation of a second handle according to an embodiment of the present invention.
Figure 3:
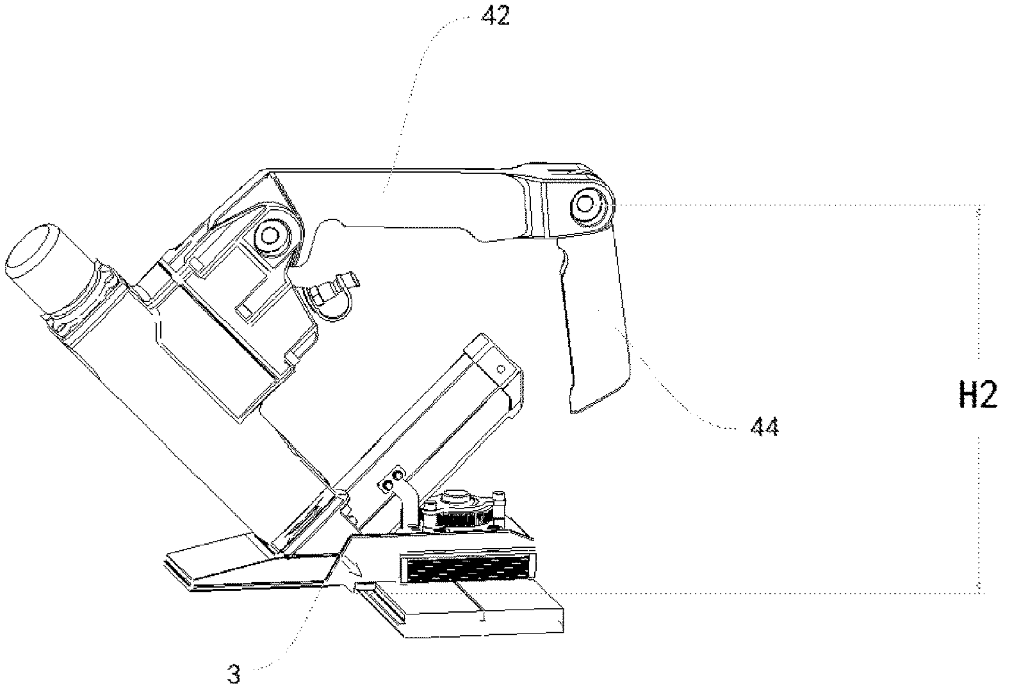
FIG. 3 is a schematic diagram of an overall structure in another state according to an embodiment of the present invention.

FIGS. 1 to 3 show diagrams of an overall structure according to an embodiment of the present invention. In this embodiment, a base 1, a fastener container 2, a driving mechanism 3 and a holding part 4 are comprised. When this embodiment is applied to the installation of floorings, the fastener container 2 is a magazine for accommodating flooring nails, and the driving mechanism 3 may be of a gas driven or electrically driven type. The fastener container 2 is detachably and fixedly connected to the base 1, and the preferred connection method includes snap-fitting and the like. The driving mechanism 3 is fixedly connected to the base 1. The holding part 4 comprises a first handle 42 and a second handle 44. The first handle 42 and the driving mechanism 3 are connected via the first connection mechanism 41. In other embodiments, the first handle 42 may also be directly connected to the base 1. The second handle 44 and the first handle 42 are connected via a second connection mechanism 43. In this embodiment, the fastener container 2 and the driving mechanism 3 are both strip-shaped, and a line a where the fastener container 2 is located and a line b where the driving mechanism 3 is located intersect, forming a main plane. The plane where a lower surface of the base 1 is in contact with a wooden board is an operation plane. The main plane is arranged to be perpendicular to the operation plane.

The preferred connection method of the first connection mechanism 41 and the second connection mechanism 43 is hinged connection, that is, a first shaft is provided at the first connection mechanism 41 and a second shaft is provided at the second connection mechanism 43, such that the first handle 42 rotates about the first shaft relative to the driving mechanism 3, and the second handle 44 rotates about the second shaft relative to the first handle 42. In this embodiment and other embodiments below, the arrangements of the second connection mechanism 43 and the second shaft will be described specifically. The first connection mechanism 41 and the first shaft may adopt any of the arrangements described below to achieve the same technical effect.

Different settings of the direction of the second shaft can make the rotation position of the second handle 44 different. If the second shaft is arranged to be perpendicular to the main plane, the second handle 44 rotates about the second shaft in the main plane. If the second shaft is arranged to be parallel to the main plane, most particularly, the second shaft is in the main plane and is arranged to be parallel to the main plane, when the second handle 44 rotates about the second shaft, it may be in the main plane or may form a certain included angle with the main plane. No matter which direction the second shaft is arranged in, the second connection mechanism 43 provides at least two locking positions, such that the second handle 44 is fixed relative to the first handle 42. At the same time, an operation part is provided, and the second handle 44 can be locked and unlocked by the operation part.

As shown in FIGS. 1 and 3, through the adjustment of the first connection mechanism 41 and the second connection mechanism 43, different postures of the first handle 42 and the second handle 44 can cause the overall height of the device to be changed from H1 in FIGS. 1 to H2 in FIG. 3, wherein H1 is different from H2. For the convenience of description, it is assumed that H1 is greater than H2. When the height of the user is relatively high, or in the case of standing up, the setting with higher overall height can be selected, that is, the state in FIG. 1, and when the height of the user is relatively short, or in the case of squatting down for construction, the setting with lower overall height can be used, that is, the state in FIG. 3, so as to reduce the fatigue of the user due to the improper height or standing posture. In addition, the reduction in the overall height also facilitates packaging and transportation.

Due to the existence of the second connection mechanism 43, the second handle 44 can be adjusted to various angles. When the device is in different positions relative to the user, the angle of the second handle 44 can be adjusted to meet different holding postures of the user, so as to reduce the fatigue of the user caused by improper holding postures and to increase the work efficiency.

Embodiment 2

Figure 4:
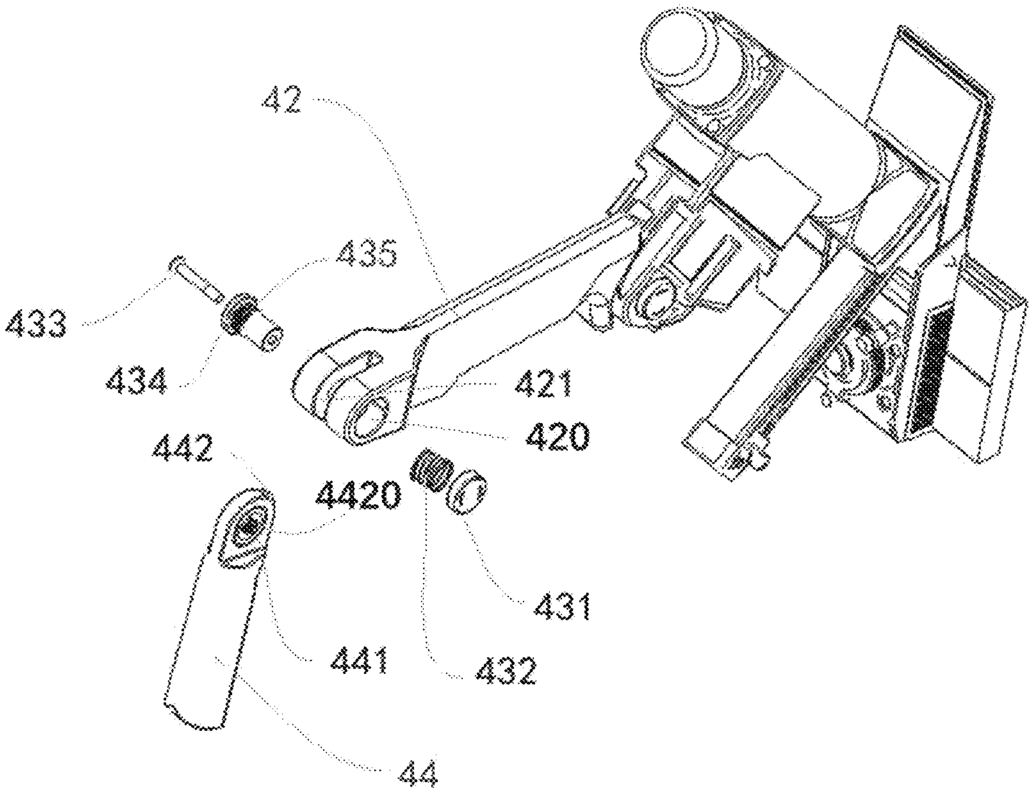
FIG. 4 is a schematic exploded structural diagram of a second connection mechanism according to an embodiment of the present invention.
Figure 5:
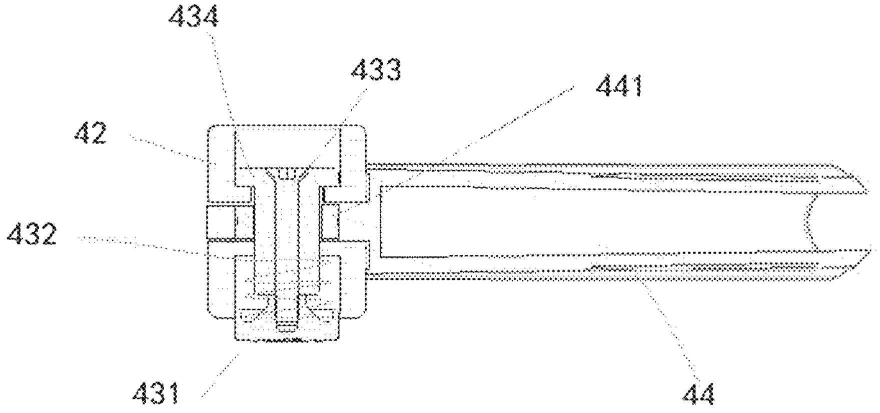
FIG. 5 is a schematic structural diagram of a second connection mechanism with a button being released according to an embodiment of the present invention.
Figure 6:
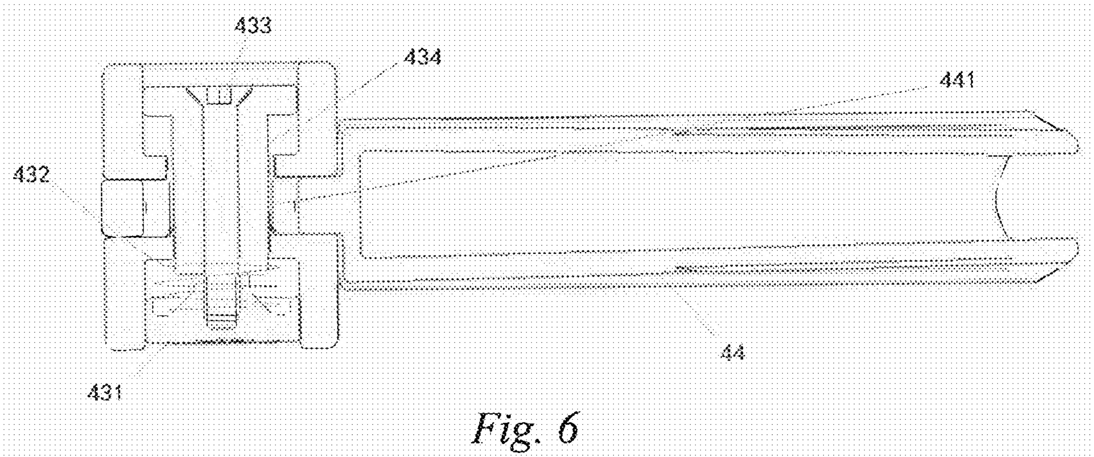
FIG. 6 is a schematic structural diagram of a second connection mechanism with a button being pressed according to an embodiment of the present invention.

FIGS. 4 to 6 show specific structures of a second connection mechanism 43 in an embodiment of the present application. A groove 421 provided on the first handle 42 and a lug 442 provided on the second handle 44 are comprised. The size of the groove 421 matches that of the lug 442, and through-holes 420, 4420 are provided at corresponding positions of the groove 421 and the lug 442. The through-holes may allow a strip-shaped object to pass through, thereby connecting the first handle 42 and the second handle 44. It should be noted that in FIGS. 4 to 6, since the groove 421 is a U-shaped groove with two walls, it is necessary to provide three through-holes. In other embodiments, a single-wall groove may also be used. It is only necessary to provide a corresponding number of through-holes to ensure the connection between the first handle 42 and the second handle 44. In addition, in this embodiment, the three through-holes are coaxially arranged. In other embodiments, the through-holes may not be strictly coaxially arranged, and it is only necessary to ensure that the passage of the strip-shaped object can realize the rotatable connection of the first handle 42 and the second handle 44. In this embodiment, teeth are further provided on the inner side of the through-hole 4420 provided in the lug 442, such that the through-hole 4420 becomes a toothed ring 441. In order to provide a retaining function, a button 431, a spring 432, a pin 433 and a retaining shaft 434 are provided in this embodiment. The retaining shaft 434 is fixedly connected to the button 431 via the pin 433. The pin 433 is coaxially arranged with the retaining shaft 434 to form a second shaft. The retaining shaft 434 is cylindrical, and a portion thereof away from the button 431 is provided with rotating shaft teeth 435. When the retaining shaft 434 is at a proper position, the rotating shaft teeth 435 engages with the toothed ring 441 to form the locking of the first handle 42 and the second handle 44. When the retaining shaft 434 is at another proper position, the rotating shaft 435 is separated from the toothed ring 441 to realize unlocking.

FIG. 5 shows a locked state of this embodiment. The spring 432 is provided between the button 431 and the toothed ring 441, such that an elastic force of the spring 432 drives the button 431 to move away from the toothed ring 441 and at the same time drives the retaining shaft 434 to move axially along the second shaft. Accordingly, the rotating shaft teeth 435 is at the position where they engage with the toothed ring 441.

FIG. 6 shows an unlocked state of this embodiment. An external force is applied to the button 431, such that the button 431 is close to the toothed ring 441, and at the same time, the retaining shaft 433 is driven to move axially along the second shaft. Accordingly, the rotating shaft teeth 435 is at the position where they are separated from the toothed ring 441. In this case, the second handle 44 can rotate freely to realize unlocking.

Since the spring 432 is compressed in the unlocked state, when the external force is removed, the spring 432 returns to its original state, returning to the locked state of this embodiment as shown in FIG. 5.

Embodiment 3

Figure 7:
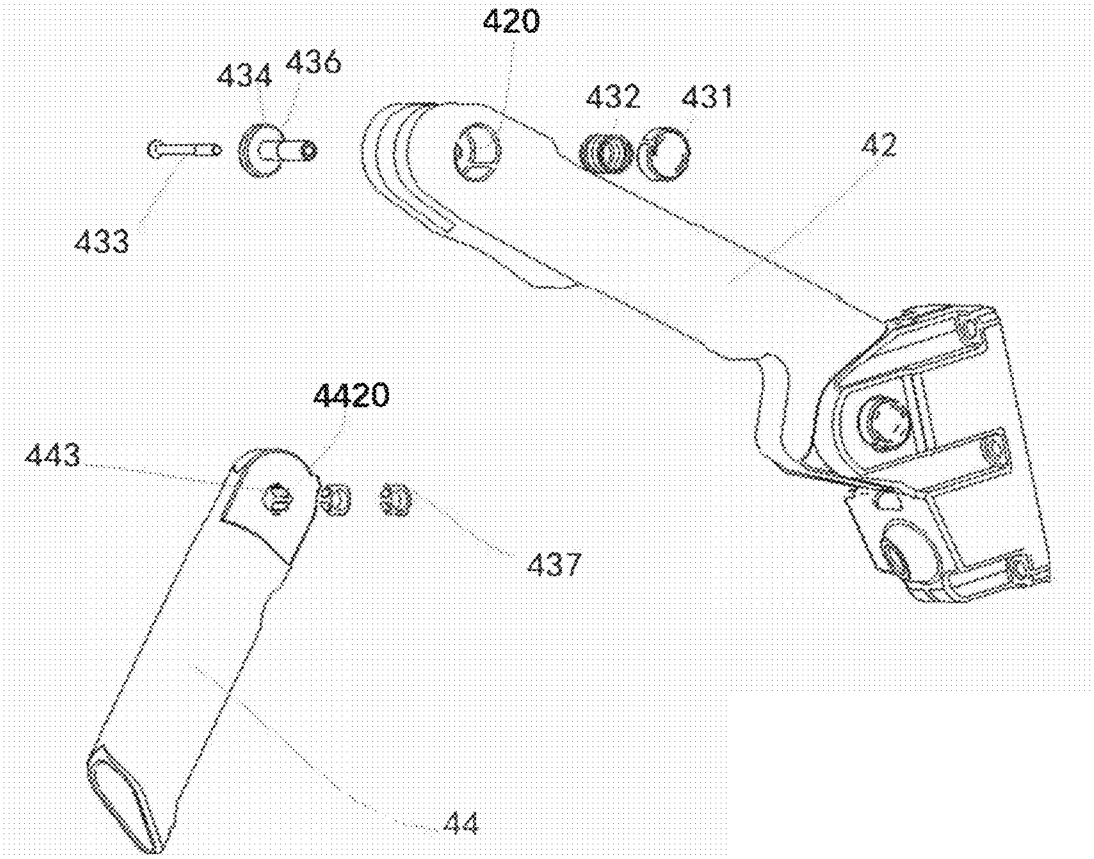
FIG. 7 is a schematic exploded structural diagram of a second connection mechanism according to an embodiment of the present invention.
Figure 8:
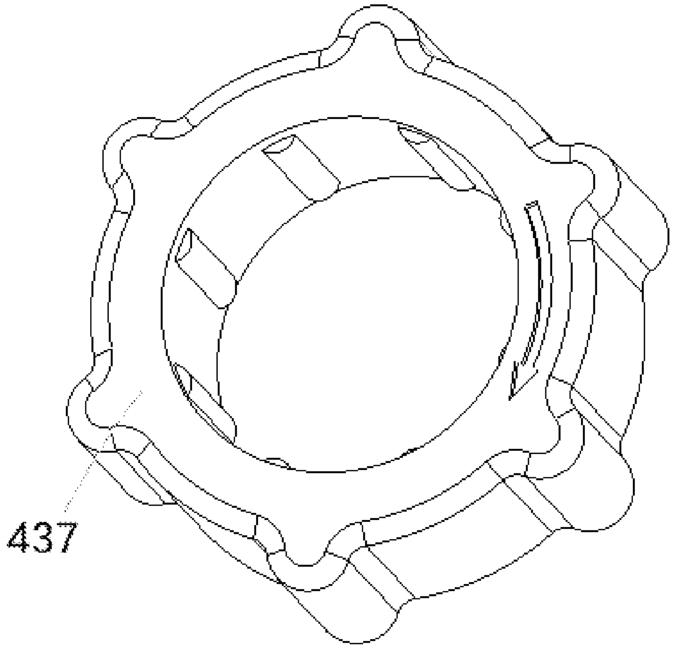
FIG. 8 is a schematic structural diagram of a one-way bearing used in an embodiment of the present invention.

As shown in FIG. 7, in this embodiment, the inner side of the through-hole 4420 in the lug 442 is provided with a retaining groove 443, and the retaining groove 443 has a depth such that it can accommodate the thicknesses of two one-way bearings 437 (as shown in FIG. 8). The size of the inner contour of the retaining groove 433 conforms to that of the outer contour of the one-way bearings 437. The pin 433, the retaining shaft 434, and the one-way bearing 437 are coaxially arranged to form a second shaft. The two one-way bearings 437 are sheathed on a bearing matching part 436 of the retaining shaft 434. The rotation directions of the two one-way bearings 437 are opposite. When no external force is applied to the button 431, the two one-way bearings 437 are in the retaining groove 433, the second arm 44 is in a locked state, and the spring 432 is compressed. When an external force is applied to the button 431, not both of the one-way bearings 437 are in the retaining groove 433, such that the second handle 44 can be rotated in one direction or two directions while in an unlocked state. When the external force is removed, it returns to the locked state again. Compared with Embodiment 2, the advantage of this embodiment is that stepless adjustment can be achieved, such that the second handle 44 can be adjusted to any angle without being restricted by the fit between teeth.

Embodiment 4

Figure 9:
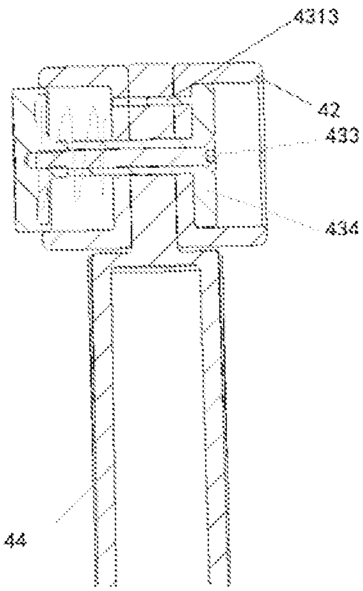
FIG. 9 is a schematic structural diagram of a second connection mechanism according to an embodiment of the present invention.
Figure 10:
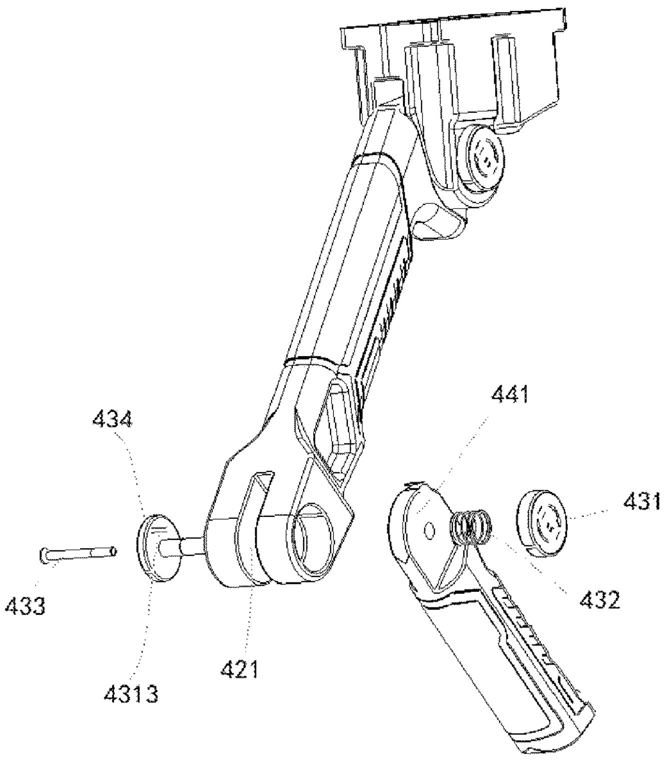
FIG. 10 is a schematic exploded structural diagram of a second connection mechanism according to an embodiment of the present invention.

As shown in FIGS. 9 and 10, in this embodiment, no special treatment is performed on the inner side of the through-hole in the lug 442, but at least two raised shaft holes are provided around the through-hole. At the same time, at least one raised shaft 4313 is provided on the retaining shaft 434. When no external force is applied to the button 431, due to the action of the spring 432, the raised shaft 4313 is inserted into the raised shaft hole to realize the locking of the second handle 44. When an external force is applied to the button 431, the spring 432 is compressed and drives the retaining shaft 434 to move axially at the same time, and the raised shaft 4313 also exits the raised shaft hole to realize unlocking. When the external force is removed, it returns to the locked state. The advantage of this embodiment is that there is no need to machine the inner side of the through-hole in the lug 442, thereby reducing the manufacturing difficulty and the production cost.

Embodiment 5

Figure 11:
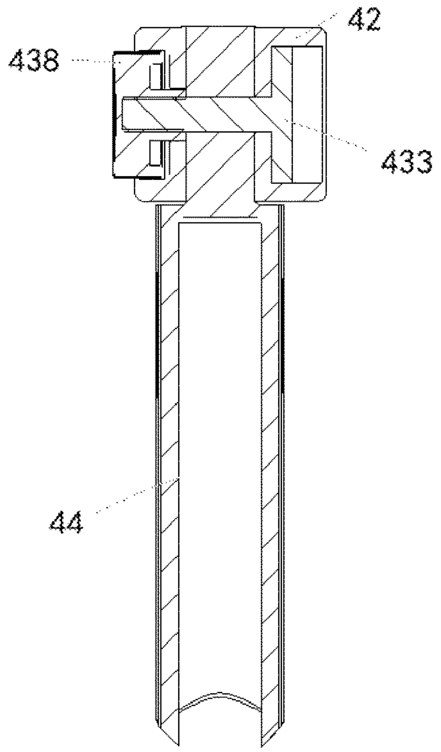
FIG. 11 is a schematic structural diagram of a second connection mechanism according to an embodiment of the present invention.

As shown in FIG. 11, in this embodiment, the button 431 and the spring 432 are not used to realize locking and unlocking, but a knob 438 fixedly connected to the pin 433 is used to realize locking and unlocking. When the knob 438 is tightened, the second handle 44 and the first handle 42 are relatively fixed and are in a locked state. When the knob 438 is loosened, the second handle 44 can rotate about the second shaft relative to the first handle 42, and they are in an unlocked state.

Embodiment 6

Figure 12:
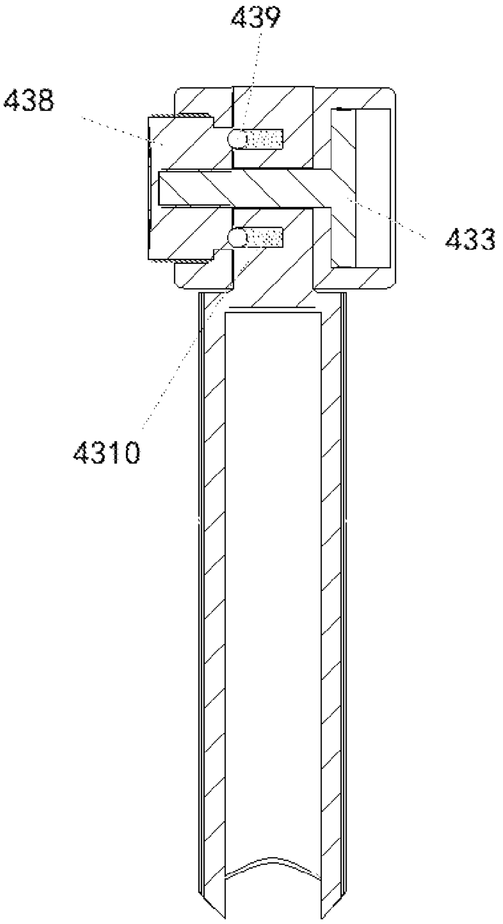
FIG. 12 is a schematic structural diagram of a second connection mechanism according to an embodiment of the present invention.
Figure 13:
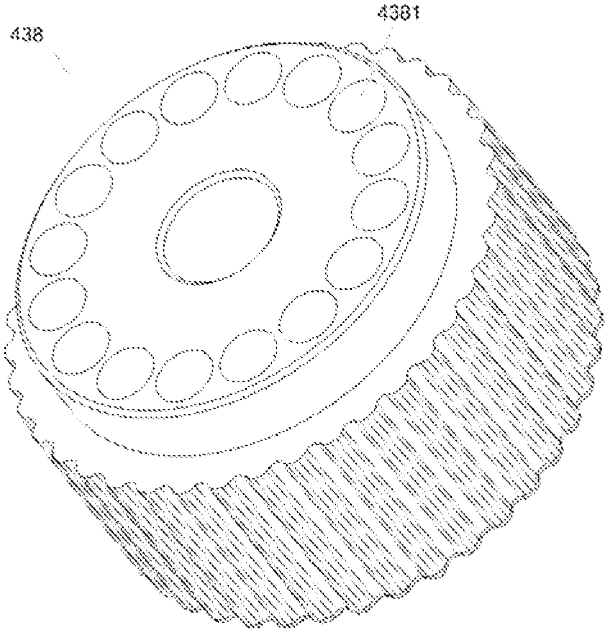
FIG. 13 is a schematic structural diagram of a knob used in an embodiment of the present invention.

As shown in FIGS. 12 and 13, in this embodiment, based on the use of the knob 438, ball accommodating grooves for accommodating balls 439 and ball springs 4310 are provided in the lug 442. Ball grooves 4381 are provided on the side of the knob 438 that is close to the lug 442, and the size of the ball grooves 4381 conforms to that of the balls 439. In the process of tightening of the knob 438, the ball grooves 4381 are brought into contact with the balls 439, and a sound is emitted as a tightening prompt, to confirm that the knob 438 is in a tightened position.

Embodiment 7

Figure 14:
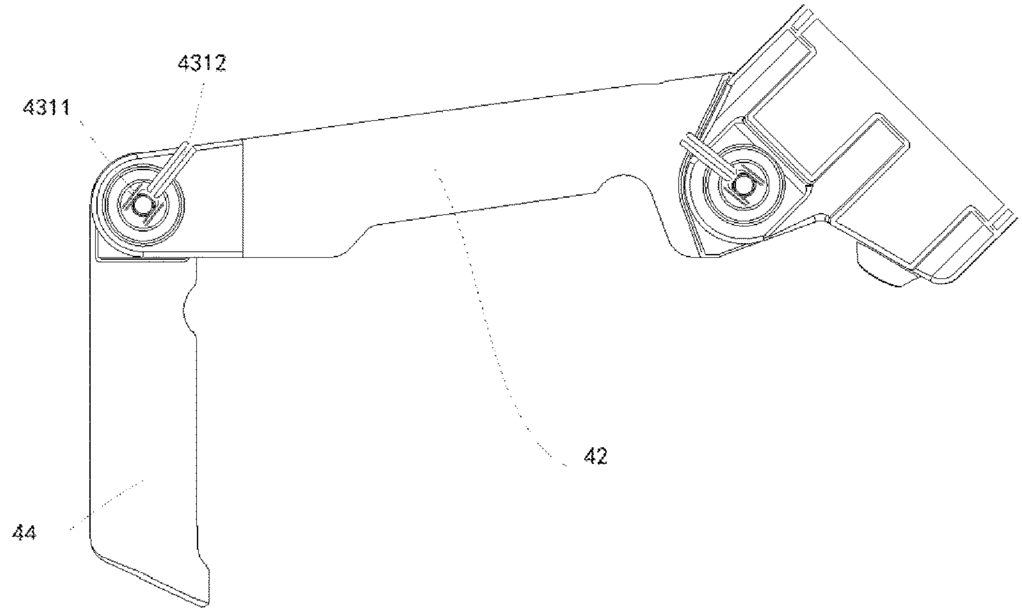
FIG. 14 is a schematic structural diagram of a holding part according to an embodiment of the present invention.
Figure 15:
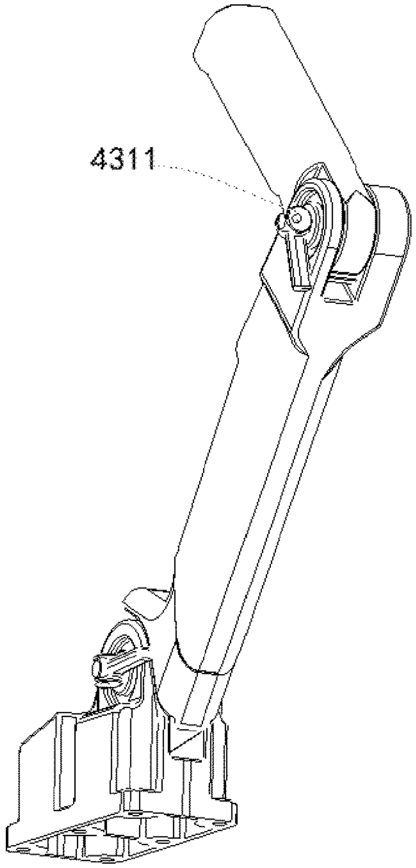
FIG. 15 is a schematic structural diagram of a holding part according to an embodiment of the present invention.
Figure 16:
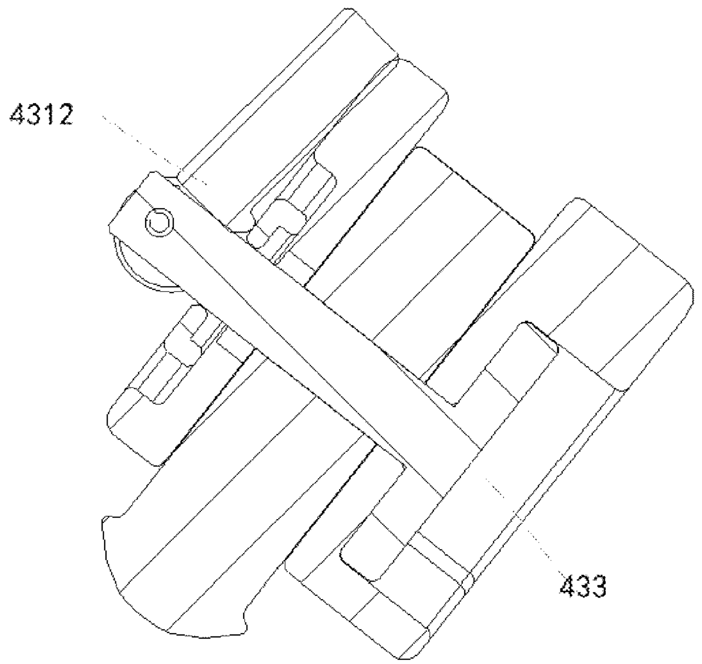
FIG. 16 is a schematic structural diagram of a second connection mechanism according to an embodiment of the present invention.

As shown in FIGS. 14 to 16, an eccentric cam 4311 and a lever 4312 are used in this embodiment to drive the pin 433 to axially rotate along the second shaft so as to realize the locked and unlocked states.

Embodiment 8

Figure 17:
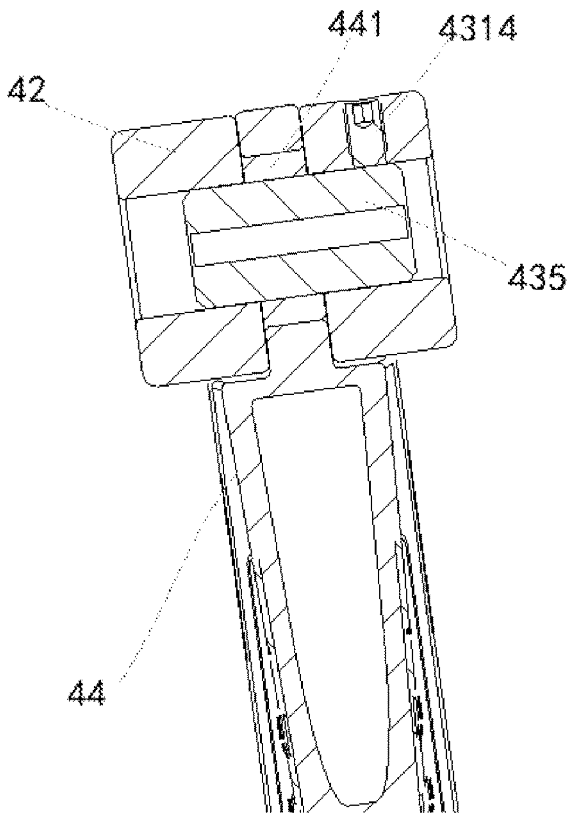
FIG. 17 is a schematic structural diagram of a second connection mechanism according to an embodiment of the present invention.

As shown in FIG. 17, in this embodiment, the same locking method by which the toothed ring 441 engages with the rotating shaft teeth 435 in Embodiment 1 is used. The difference from Embodiment 1 is that the positions of the rotating shaft teeth 435 are not changed, so the toothed ring 441 and the rotating shaft teeth 435 will not be separated. A space is provided on the first handle 42 for accommodating a toothed fastener 4314. The toothed fastener 4314 may be a screw. When locking is desired, the toothed fastener 4314 is fastened such that the rotating shaft teeth 435 are fixed relative to the first handle 42. Since the rotating shaft teeth 435 engage with the toothed ring 441, and the toothed ring 441 is fixedly connected to the second handle 44, the second handle 44 is fixed relative to the first handle 42 in a locked state. When the toothed fastener 4314 is released, the rotating shaft teeth 435 can rotate relative to the first handle 42 and therefore the second handle 44 can also rotate relative to the first handle 42 in an unlocked state.

Embodiment 9

Figure 18:
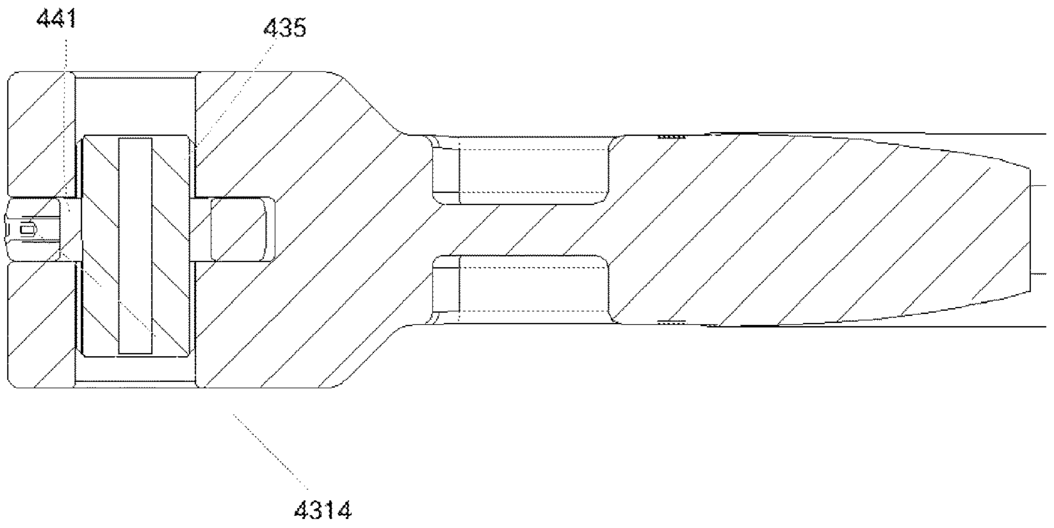
FIG. 18 is a schematic structural diagram of a second connection mechanism according to an embodiment of the present invention.

As shown in FIG. 18, this embodiment is similar to Embodiment 8, except that the rotating shaft teeth 435 are fixedly connected to the first handle 42, and the toothed ring 441 and the lug 442 can move relative to each other. The toothed fastener 4314 is provided on the second handle 44. When locking is desired, the toothed fastener 4314 is tightened, such that the toothed ring 441 is fixed relative to the second handle 44. Since the toothed ring 441 engages with the rotating shaft teeth 435, and the rotating shaft teeth 435 are fixedly connected to the first handle 42, the second handle 44 is fixed relative to the first handle 42 in a locked state. When the toothed fastener 4314 is released, the toothed ring 441 can rotate relative to the second handle 44, and therefore the second handle 44 can also rotate relative to the first handle 42 in an unlocked state.

Embodiment 10

Figure 19:
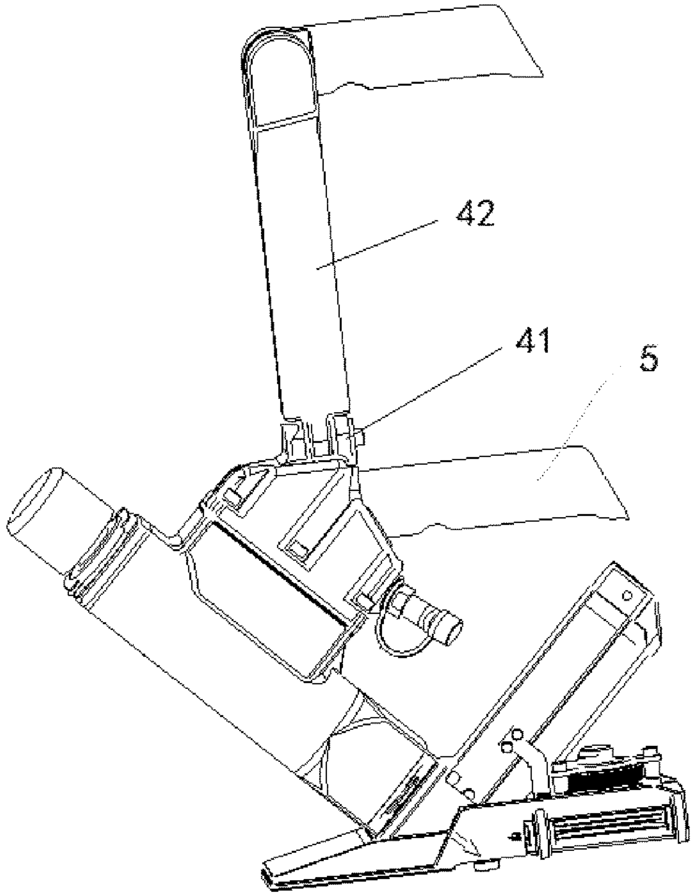
FIG. 19 is a schematic diagram of an overall structure in a state according to an embodiment of the present invention.
Figure 20:
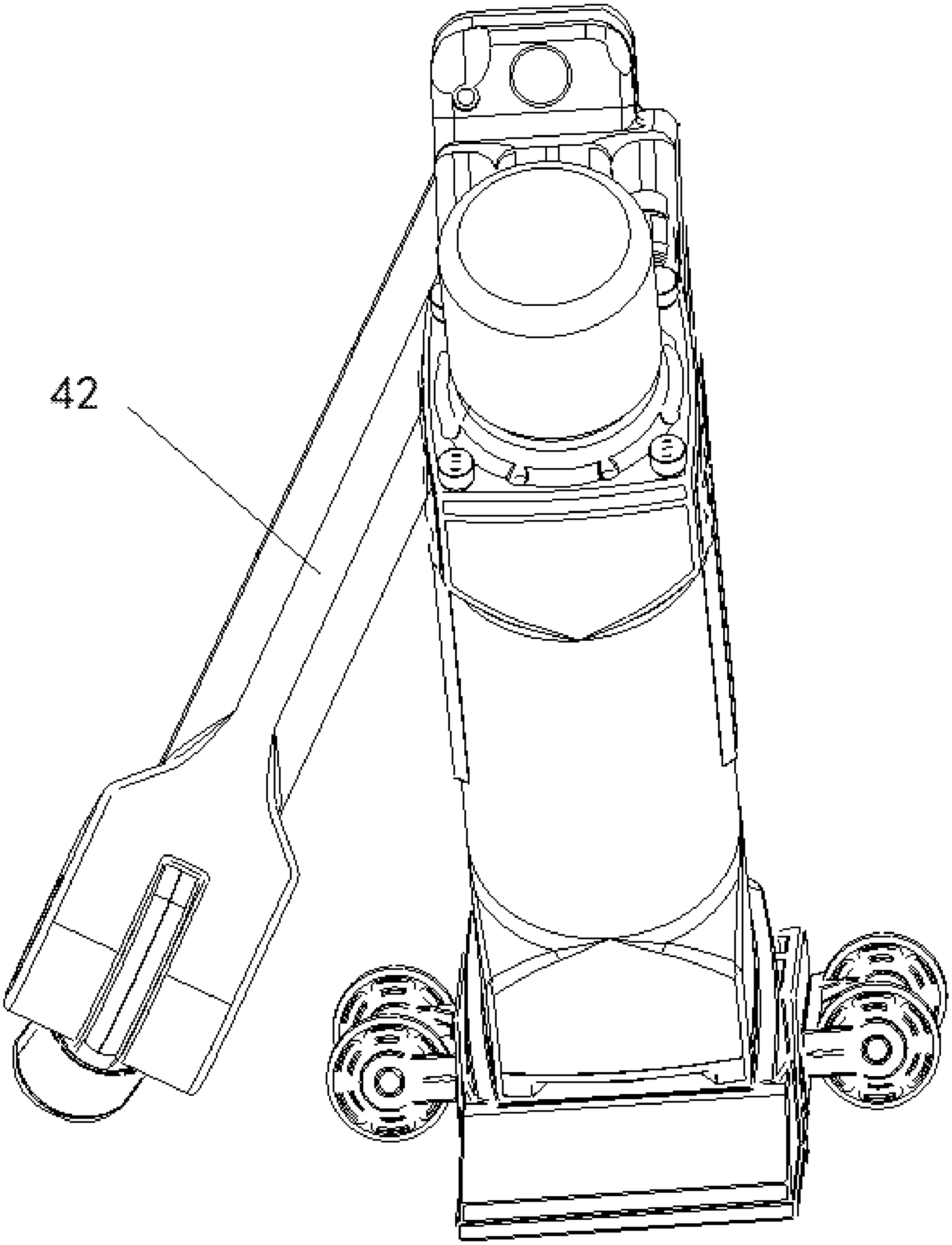
FIG. 20 is a schematic diagram of an overall structure in another state according to an embodiment of the present invention.

As shown in FIGS. 19 and 20, in this embodiment, a third handle 5 is also comprised. The third handle 5 is fixedly connected to the driving mechanism 3, and may be fixed to the driving mechanism 3, or may be detachably connected thereto. The first shaft of the first connection mechanism 41 is arranged to be parallel to the main plane, such that when the first handle 42 rotates about the first shaft, it can form a certain included angle with the main plane. This embodiment is suitable for scenarios where the construction space is insufficient. The first handle 42 can drive the second handle 44 to be folded to a certain angle. Preferably, the first handle 42 can form an angle of 90 degrees with the main plane to reduce the overall height of the device as much as possible. In this case, the user can carry out construction by holding the third handle 5.

Embodiment 11

Figure 21:
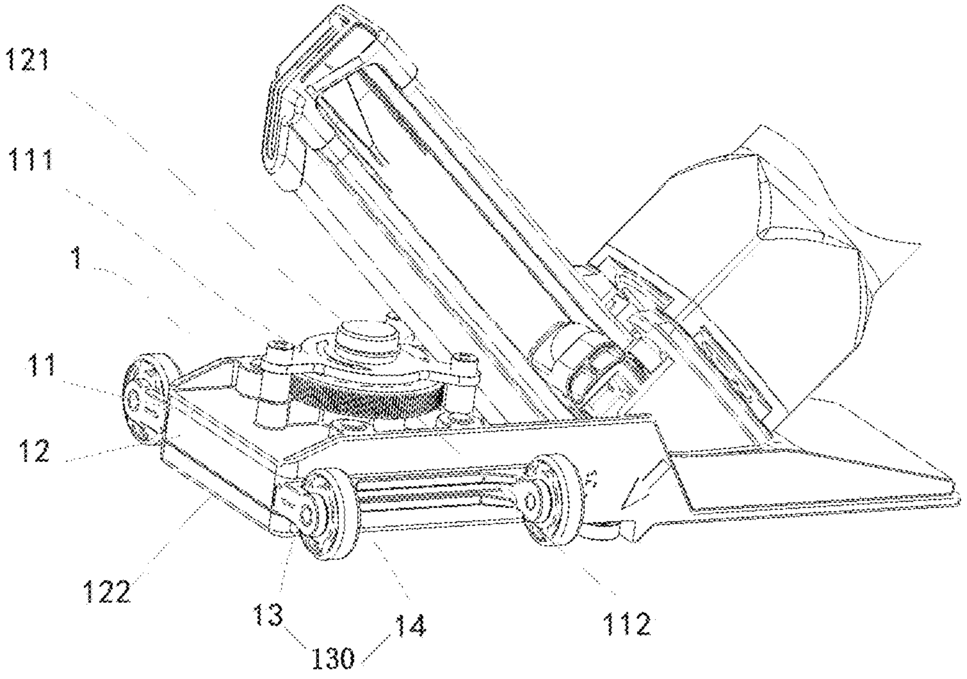
FIG. 21 is a schematic structural diagram of a base and a moving mechanism according to an embodiment of the present invention.
Figure 22:
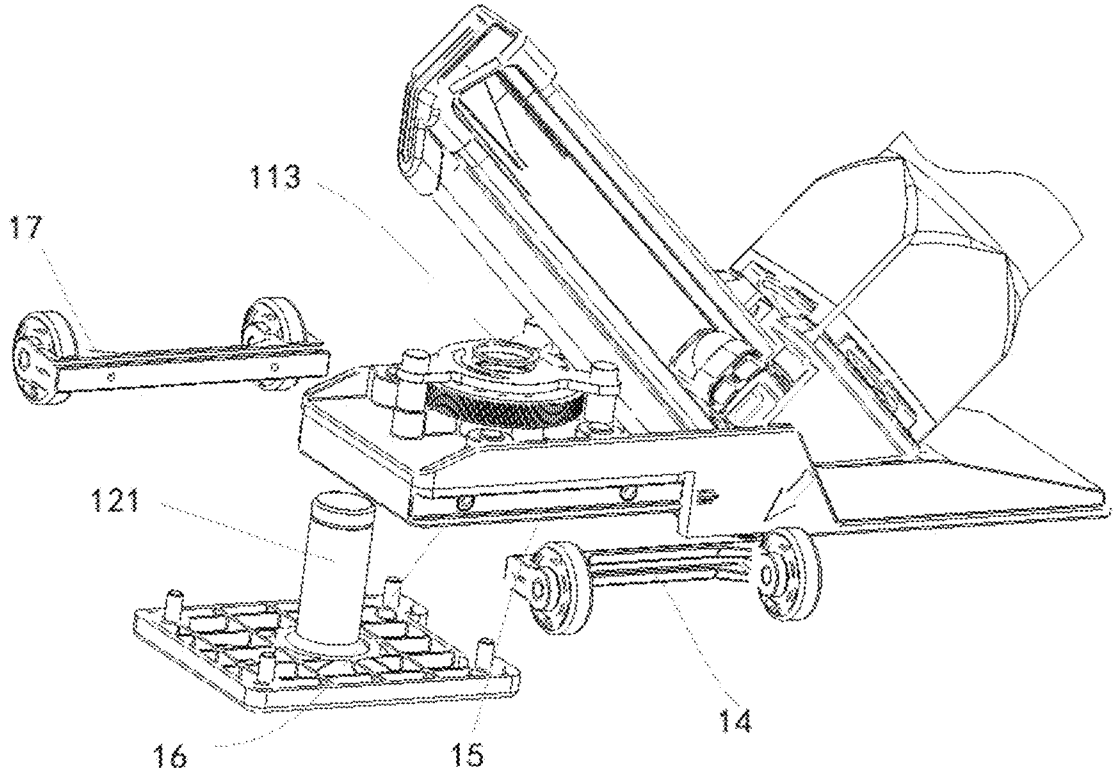
FIG. 22 is a schematic exploded structural diagram of a base and a moving mechanism according to an embodiment of the present invention.
Figure 23:
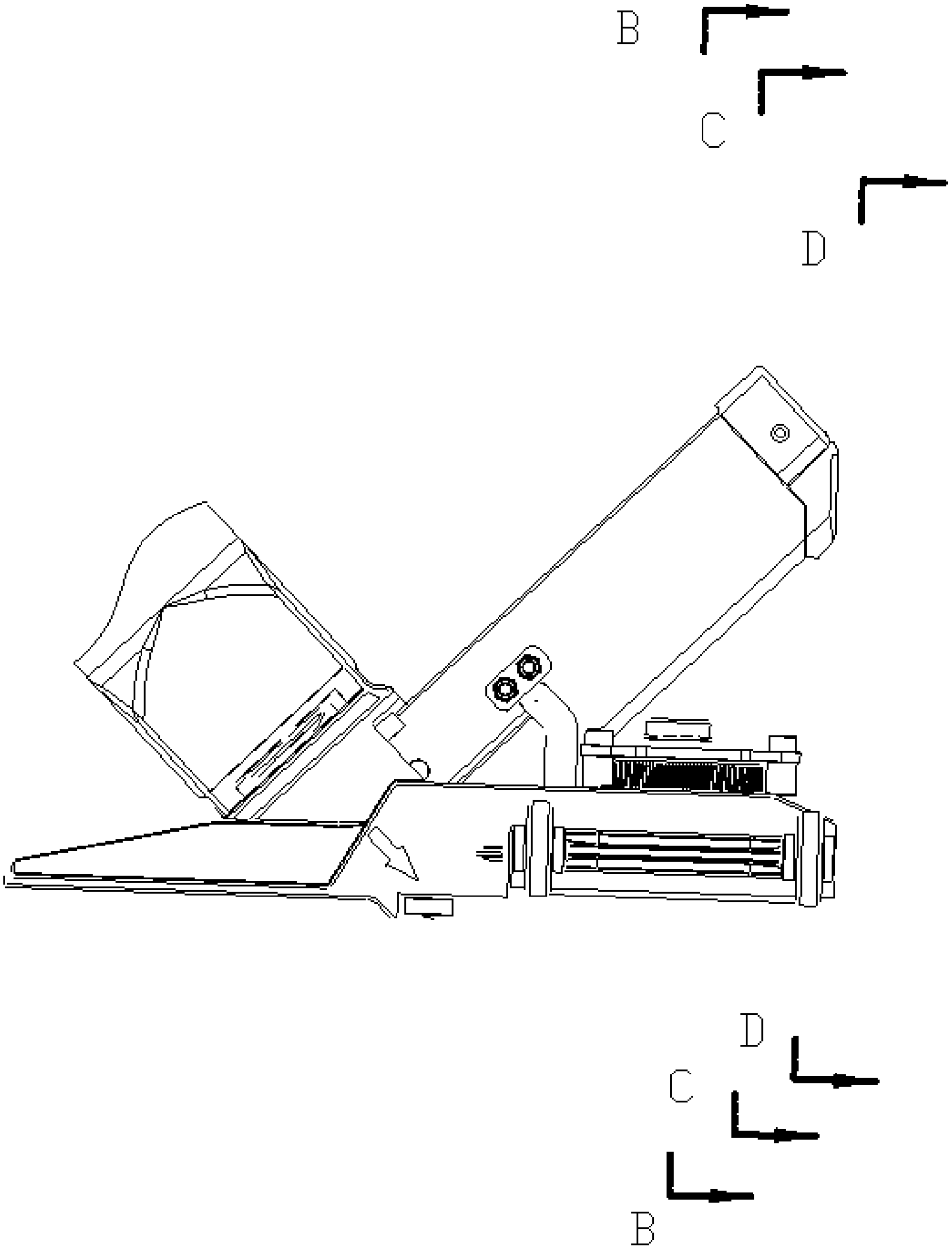
FIG. 23 is a position marking diagram of cross-sections of a base and a moving mechanism according to an embodiment of the present invention.

As shown in FIG. 21, in this embodiment, the base 1 specifically comprises a base body 11 and an adjustable plate 12. The adjustable plate 12 is provided with a backing plate 122. The backing plate 122 is in contact with the board material, to reduce the damage to the board material. The backing plate 122 is generally made of a plastic material, and is fixedly connected to the adjustable plate 12 via backing plate screws 123. In order to ensure that the adjustable plate 12 can provide a stable connection, the adjustable plate 12 is generally a metal die casting. The adjustable plate 12 is provided with an adjustable plate stud 121, and a rotating disk 112 is provided at the corresponding position of the base body 11. Inner threads of the rotating disk 112 conform to outer threads of the adjustable plate stud 121. By rotating the rotating disk 112 to drive the adjustable plate stud 121, the height of the adjustable plate 12 can be adjusted. The rotating disk 112 is fixed to the base body 11 via a limiting plate 111, a circlip 113 and a rotating disk bolt 114.

The base body 11 in this embodiment is further provided with a moving mechanism 130 to assist the movement. Specifically, roller brackets 13 and rollers 14 are comprised. The rollers 14 are rotatably fixed to the roller brackets 13. In order to facilitate packaging and transportation of the device, the moving mechanism needs to be detachable. Therefore, a sliding groove 15 is further provided at each connection between the base body 11 and the moving mechanism in this embodiment, and each of the roller brackets 13 is detachably connected to the base body 11 via the sliding groove 15. A bracket ball 16 is provided on the roller bracket 13, and a bracket ball retaining groove 17 is provided at a corresponding position in the sliding groove 15, so as to realize the limiting and locking of the roller bracket 13 on the sliding groove 15.

Figure 24:
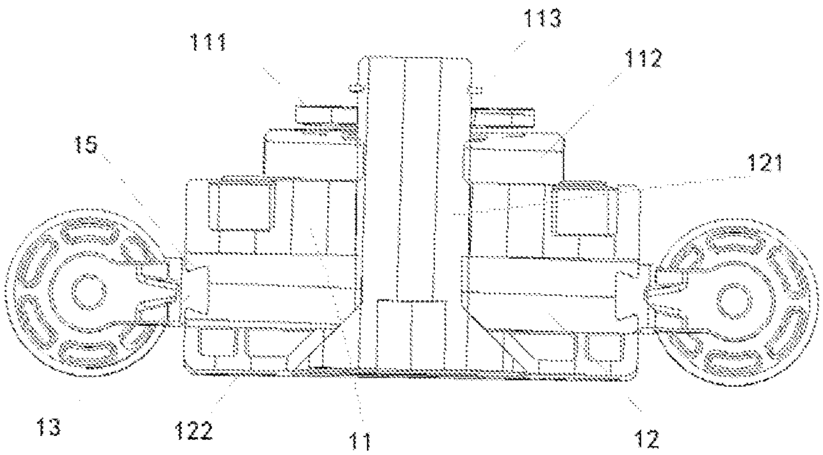
FIG. 24 is a cross-sectional diagram of a base and a moving mechanism according to an embodiment of the present invention.
Figure 25:
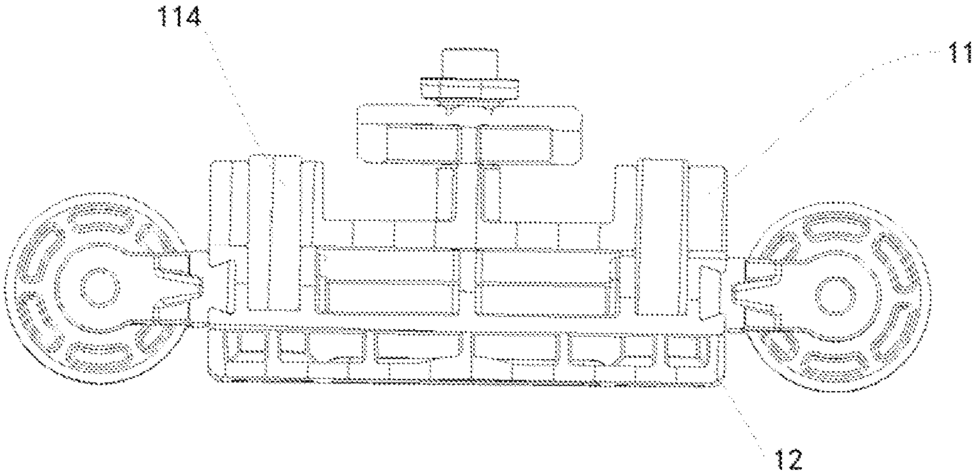
FIG. 25 is a cross-sectional diagram of a base and a moving mechanism according to an embodiment of the present invention.
Figure 26:
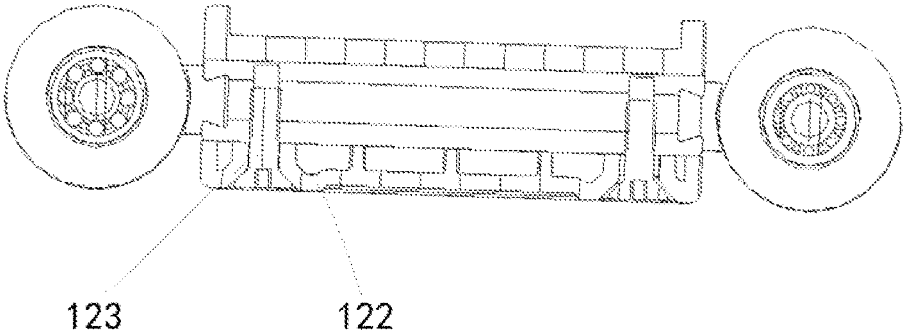
FIG. 26 is a cross-sectional diagram of a base and a moving mechanism according to an embodiment of the present invention.

More detailed structures of the adjustable plate 12 and the moving mechanism are described in FIGS. 23 to 26. FIGS. 24, 25 and 26 are respectively cross-sectional diagrams of the structures at positions B, C and D in FIG. 23.

Embodiment 12

Figure 27:
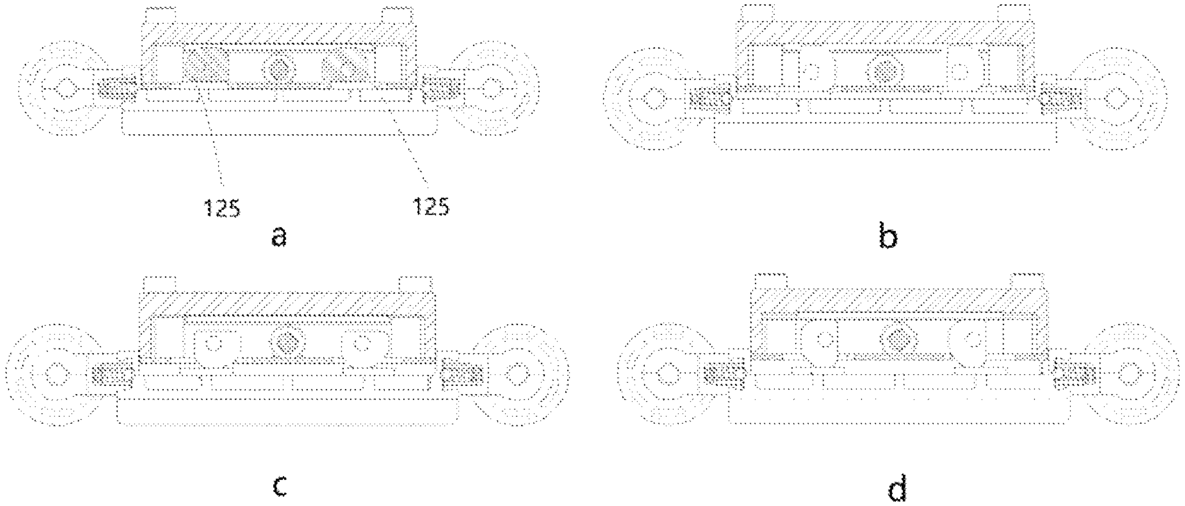
FIG. 27 is a cross-sectional diagram of an adjustable plate according to an embodiment of the present invention.

As shown in FIG. 27, in this embodiment, two height adjustment camshafts 125 are provided in parallel inside the base. An upper surface of the adjustable plate 12 is attached to outer surfaces of the height adjustment camshafts 125 via four posts and springs. The height adjustment camshaft 125 is cylindrical with unequal radii. Since the upper surface of the adjustable plate 12 comes into contact with the surfaces of the height adjustment camshafts 125, the height of the bottom of the base changes accordingly as the height adjustment camshaft 125 rotates to different angles. As shown in FIG. 7, the height adjustment camshaft 125 used in this embodiment has four curved surfaces, such that the bottom of the base has four different heights. As shown in a, b, c, and d of FIG. 7, the height adjustment camshaft 125 is rotated to four different positions, respectively, such that the bottom of the base has the corresponding heights. In other embodiments, the height adjustment camshaft 125 may be provided with a different number of curved surfaces according to actual requirements, so as to achieve the technical effect of adjusting the height of the bottom of the base.

Embodiment 13

Figure 28:
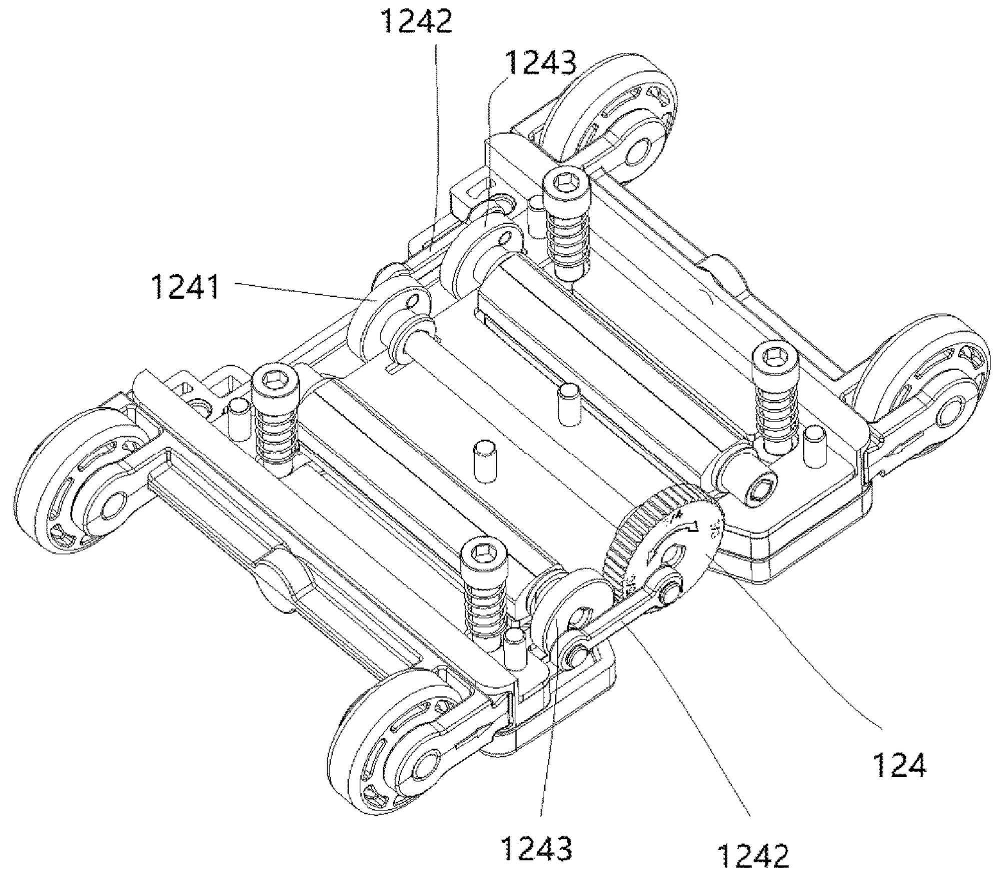
FIG. 28 is a schematic structural diagram of an adjustable plate according to an embodiment of the present invention.

As shown in FIG. 28, in this embodiment, ends of the two height adjustment camshafts 125 provided inside the base are respectively provided with driven wheels 1243. The driven wheels 1243 are configured to be fixed to the height adjustment camshafts 125. When the driven wheels 1243 are driven by an external force, the height adjustment camshafts 125 can be driven to rotate. In this embodiment, one of the two driven wheels 1243 is connected to the driving wheel 1241 via a connecting rod 1242, and the other of the two driven wheels 1243 is connected to a height adjustment part 124 via a connecting rod 1242. The height adjustment part 124 is a knob. The height adjustment part 124 and the driving wheel 1241 have the same size, and are respectively fixed to two ends of a wheel shaft. When a user operates the height adjustment part 124, that is, when the knob is turned, the height adjustment part 124 and the driving wheel 1241 rotate at the same angular velocity. Under the drive of the connecting rods 1242, the driven wheel 1243 connected to the height adjustment part 124 and the driven wheel 1241 connected to the driving wheel 1241 rotate in the same direction and at the same angular velocity. The height adjustment camshafts 125 are driven to rotate, so as to adjust the height of the bottom of the base.

Embodiment 14

Figure 29:
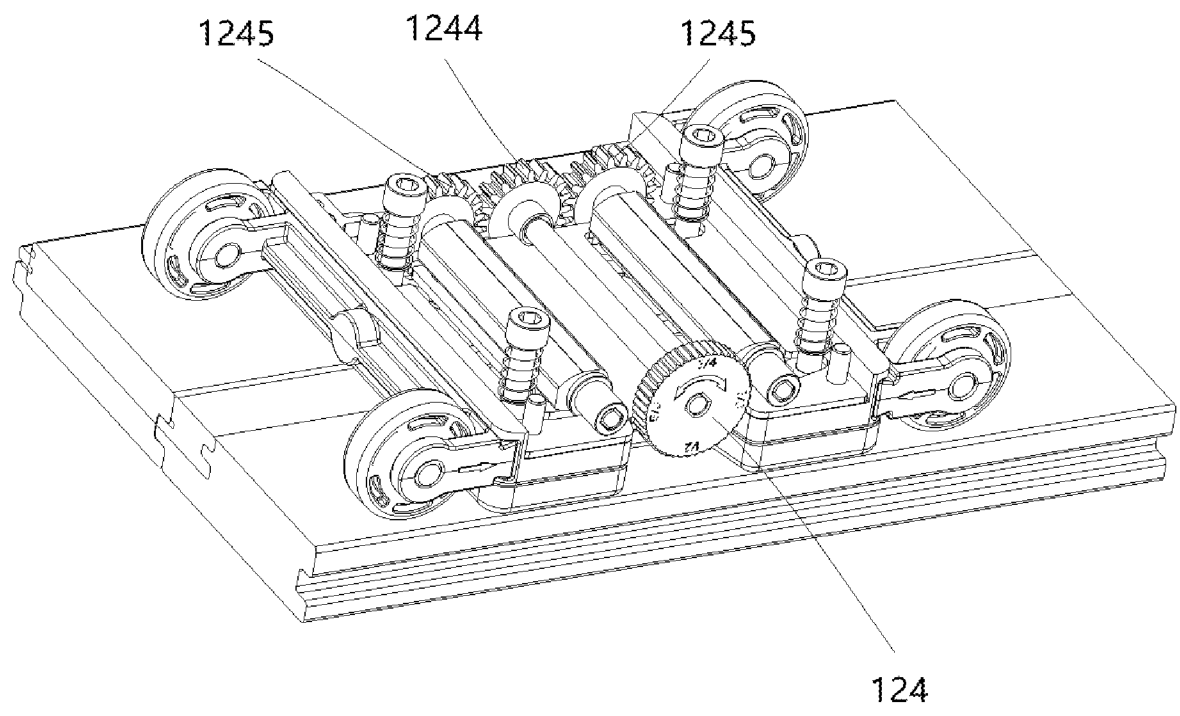
FIG. 29 is a schematic structural diagram of an adjustable plate according to an embodiment of the present invention.

As shown in FIG. 29, the structures for connecting and driving the height adjustment camshafts 125 different from those of Embodiment 13 are illustrated. In this embodiment, one end of each of the two height adjustment camshafts 125 is provided with a driven gear 1245. The two driven gears 1245 with the same size and the same number of teeth engage with a driving gear 1244. A height adjustment part 124 and the driving gear 1244 are respectively fixed to two ends of a wheel shaft. The height adjustment part 124 is a knob. When the user operates the height adjustment part 124, that is, turning the knob, the driving gear 1244 is driven to rotate. The two driven gears 1245 are driven by the driving gear 1244 to rotate at the same angular velocity but in opposite directions. In this embodiment, the cross sections of the two height adjustment camshafts 125 are symmetrically provided, and therefore in their reverse rotations, it is ensured that the curved surfaces that come into contact with the upper surface of the bottom of the base are the same.

The specific preferred embodiments of the invention are described in detail as above. It should be understood that a person of ordinary skill in the art would be able to make various modifications and variations according to the concept of the present invention without involving any inventive effort. Therefore, any technical solution that can be obtained by those skilled in the art by means of logical analysis, reasoning or limited trials on the basis of the prior art and according to the concept of the present invention should be included within the scope of protection of the claims.

The invention claimed is:

1. A fastening device, comprising:

a base, a fastener container, a driving mechanism and a holding part, wherein the holding part is connected to the base or the driving mechanism;

wherein the holding part comprises a first handle, the first handle is provided with a first connection mechanism, and the first handle is rotatably connected to the base or the driving mechanism via the first connection mechanism; wherein the first connection mechanism is provided with a first locking/unlocking mechanism, such that the first handle has at least two locking positions where the first handle is able to be stationary relative to the base or the driving mechanism when no external force is applied;

wherein the holding part further comprises a second handle, the first handle is further provided with a second connection mechanism, the second handle is rotatably connected to the first handle via the second connection mechanism, and the second connection mechanism is provided with a second locking/unlocking mechanism, such that the second handle has at least two locking positions where the second handle is able to be stationary relative to the base when no external force is applied;

wherein the second connection mechanism comprises: a lug provided on the second handle, the lug being provided with a first through-hole; and a second through-hole provided in the first handle, wherein the first through-hole and the second through-hole are overlapped;

wherein the second locking and unlocking mechanism further comprises a pin, a retaining shaft and a button, wherein the retaining shaft is fixedly connected to the button via the pin; the pin and the retaining shaft both pass through the first through-hole and the second through- hole; the pin, the retaining shaft, and the button are coaxially arranged with the second shaft; and the button is configured to be able to drive the retaining shaft to move axially under an action of an external force;

wherein an inner side of the first through-hole is provided with a retaining groove, an outer side of the retaining shaft is provided with two one-way bearings, and a size and a shape of an inner contour of the retaining groove conform to those of an outer contour of each of the two one-way bearings; the rotation directions of the two one-way bearings are opposite;

and the retaining shaft is configured to be able to realize locking and separation between the two one-way bearings and the retaining groove under drive of the button.

2. The fastening device of claim 1, characterized in that the holding part comprises a third handle connected to the driving mechanism.

3. The fastening device of claim 1, characterized in that the base comprises a base body, an adjustable plate and a height adjustment part, wherein a height of the adjustable plate is changed by the height adjustment part.

4. The fastening device of claim 3, characterized in that the height adjustment part comprises a stud fixedly connected to the adjustable plate, and the adjustable plate is connected to the base body via the stud.

5. The fastening device of claim 4, characterized in that the main body base is provided with an annular rotating disk, and an inner surface of the annular rotating disk engage with an outer surface of the stud.

6. The fastening device of claim 3, characterized in that the height adjustment part comprises an adjustment camshaft, and an upper surface of the adjustable plate is in contact with the camshaft.

7. The fastening device of claim 6, characterized in that the height adjustment part comprises two camshafts, the base is provided with a driving wheel, and each of the camshafts is provided with a driven wheel, the driven wheels are connected to the driving wheel, and the driven wheels are configured to drive the two camshafts to rotate at a same angular velocity.

8. The fastening device of claim 1, characterized in that the base comprises a base body and a moving mechanism detachably connected to the base body.

9. The fastening device of claim 8, characterized in that the moving mechanism comprises roller brackets detachably connected to the base body.

10. The fastening device of claim 9, characterized in that sliding grooves are provided on sides of the base body, and the roller brackets are connected to the base body via the sliding grooves.

11. The fastening device of claim 10, characterized in that each of the roller brackets is provided with a bracket ball, a ball retaining groove is provided at a corresponding position on the sliding groove, and the bracket ball mates with the ball retaining groove to realize locking of the roller bracket.

* * * * *